Sept. 6, 1960 G. L. CLAPPER 2,951,952
HIGH FREQUENCY GATED TRIGGER
Filed May 14, 1958 4 Sheets-Sheet 1

INVENTOR
GENUNG L. CLAPPER
BY G. R. Gugger
AGENT

Sept. 6, 1960 G. L. CLAPPER 2,951,952

HIGH FREQUENCY GATED TRIGGER

Filed May 14, 1958 4 Sheets-Sheet 2

Sept. 6, 1960 G. L. CLAPPER 2,951,952

HIGH FREQUENCY GATED TRIGGER

Filed May 14, 1958 4 Sheets-Sheet 3

2,951,952

HIGH FREQUENCY GATED TRIGGER

Genung L. Clapper, Vestal, N.Y., assignor to International Business Machines Corporation, New York, N.Y., a corporation of New York Filed May 14, 1958, Ser. No. 735,230

10 Claims. (Cl. 307—88.5)

This invention relates to a high frequency gated trigger and more particularly to a novel transistor trigger circuit having an exceptionally high speed of operation.

In present day computer systems, the timing conditions are such that a trigger with a resolution of less than one microsecond is not only desirable but necessary. To obtain a practical trigger with a one microsecond resolution, certain conditions must be met such as a maximum gating time of 0.5 microsecond, an output rise and fall time of 0.1 microsecond, a total delay for turn on or turn off of 0.3 microsecond, and a sufficient output of power to handle reasonable loads.

The present invention meets the above conditions and, in its preferred embodiment, takes the form of a symmetrical trigger wherein each half of the trigger comprises a gate and set input inverter, a reset and cross-coupling emitter follower and a complemented inverter output driver. The complemented inverter output driver for each half of the trigger is directly coupled to the input emitter follower of the other side of the trigger. The emitter follower provides a low impedance drive for the complemented inverter driver and the complemented inverter, in turn, provides a voltage gain and inversion so that the regenerative loop gain is high enough to assure fast triggering action. In order to meet the requirement of a maximum gating time of 0.5 microsecond, the R-C time constant of the input gate was made as short as possible consistent with adequate performance. A gated set pulse is used to cut off a normally conducting P–N–P transistor which is connected in series with the N–P–N input emitter follower. In this way, the feedback loop may be broken without the overriding or bucking action common to most triggers. A reset pulse is applied to the base of the input emitter follower through a diode in such a way that it overrides both the input and the feedback. This gives the reset full control and, in fact, it is possible to hold both outputs of the trigger in the "off" condition by applying reset signals to both sides of the trigger simultaneously. In this case, the trigger will indicate which reset pulse terminated first by turning on that output.

Accordingly, it is an object of the present invention to provide a novel voltage mode gated trigger having exceptionally high speed of operation.

A further object of the present invention is to provide a novel transistor trigger circuit including a regenerative loop gain high enough to assure fast triggering action.

A further object of the present invention is to provide a trigger circuit operated by novel input gate means which enable the trigger feedback loop to be broken without the overriding or bucking action common to most triggers.

A still further object of the present invention is to provide a novel trigger circuit wherein the reset pulse is applied to override both the input and the feedback, thus giving the reset full control.

A still further object of the present invention is to provide a novel high frequency gated trigger which may easily be adapted for use as a ring, shift register, or phase detector.

Other objects of the invention will be pointed out in the following description and claims and illustrated in the accompanying drawings, which disclose, by way of example, the principle of the invention and the best mode, which has been contemplated, of applying that principle.

Figure 1:
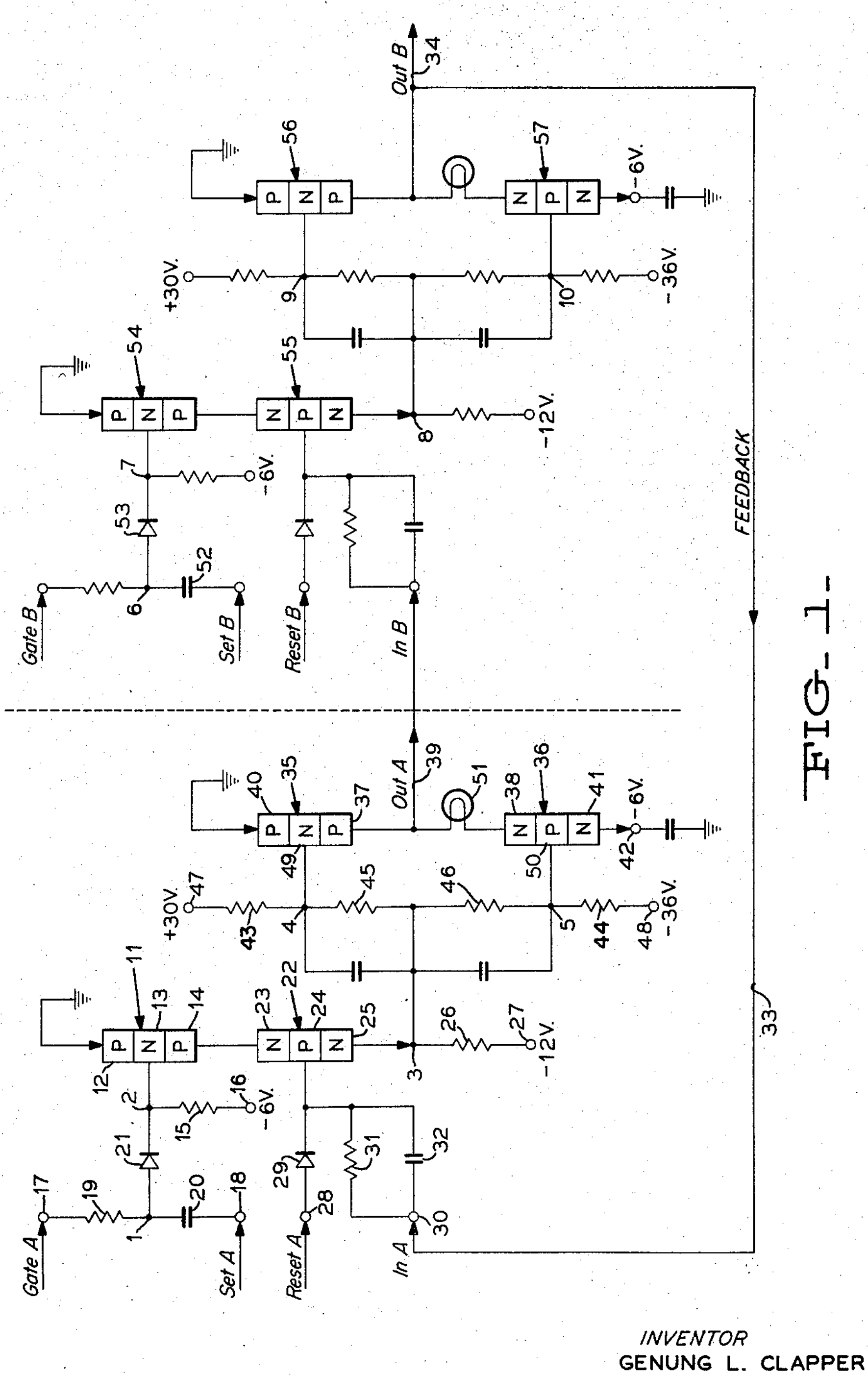
Fig. 1 is a schematic representation of a binary trigger circuit in accordance with one specific illustrative embodiment of this invention.

In accordance with a preferred embodiment of the invention, there is shown in Fig. 1 a two-stage binary trigger with each half of the trigger comprising a gate and set input inverter, a reset and cross-coupling emitter follower, and a complemented inverter output driver. Referring to the first or A stage of the trigger, for example, the input inverter takes the form of a P–N–P type transistor 11 comprising an emitter 12, base 13 and collector 14. The emitter 12 is connected to ground and the base 13 is negatively biased through a resistor 15 and the negative 6 volt terminal 16 so that transistor 11 is normally in a state of conduction. The base 13 is also connected to a Gate A pulse terminal 17 and a Set A pulse terminal 18 through an input gate comprising the resistor 19, capacitor 20 and diode 21. In order to meet the requirement of a maximum gating time of 0.5 microsecond, the R-C time constant of the input gate is made as short as possible consistent with adequate performance.

The inverter transistor 11 is connected in series with an N–P–N type emitter follower transistor 22 which comprises a collector 23, a base 24 and an emitter 25. The emitter 25 is negatively biased through a resistor 26 and the negative 12 volt terminal 27. The base 24 of the emitter follower is connected to a Reset A pulse terminal 28 through a diode 29 and is also connected in parallel to an In A terminal 30 through a resistor 31 and bypass capacitor 32. The In A terminal 30 is connected by means of a feedback line 33 to the Out B or output line 34 of the second or B stage of the trigger to speed the triggering action as will be described.

The emitter 25 of transistor 22 is connected to a complementary inverter output driver comprising a P–N–P type transistor 35 and an N–P–N type transistor 36 having their respective collectors 37, 38 connected to the Out A line 39. Through the Out A line 39 the complementary inverter output is applied to the emitter follower in stage B of the trigger in the same fashion that the complementary inverter output from stage B is applied to the emitter follower in stage A via the line 33. The emitter 40 of transistor 35 is shown connected to ground and the emitter 41 of transistor 36 is connected to a negative 6 volt terminal 42. Resistors 43, 44, 45, 46, connected between a positive 30 volt terminal 47 and a negative 36 volt terminal 48, form a dual divider which sets the voltages at the bases 49, 50. In the static or no signal condition, transistors 11 and 22 will be conducting and the potential at point 3 will be 0 volts. The base N zone of transistor 35 will be at a more positive potential than its emitter zone and no current flows through the transistor. However, the base P zone of transistor 36 will be positive with respect to its emitter zone causing current to flow in transistor 36 and placing the output A potential at a negative 6 volts as shown on Fig. 2.

The emitter follower 24 provides a low impedance drive for the complemented inverter driver and the complemented driver, in turn, provides a voltage gain and inversion so that the regenerative loop gain is high enough to assure fast triggering action. The complemented inverter driver is protected against overloads due to short circuits, and the like, by a small incandescent lamp 51 in the collector circuit of the N–P–N driver 36. The lamp will allow fairly high currents of short duration to pass while protecting against overloads and also functions as an indicator to aid in servicing the trigger.

For binary operation, the trigger is connected with Out A to Gate B, Out B to Gate A, and Set A and Set B commoned to binary input. The binary input to the trigger is shown as the first line of descriptive waveforms on Fig. 2. Time intervals are marked by the leading edge of the input pulses and are designated as T1, T2, etc. Each time interval is 1.0 microsecond for operation at 1.0 megacycle.

Figure 2:
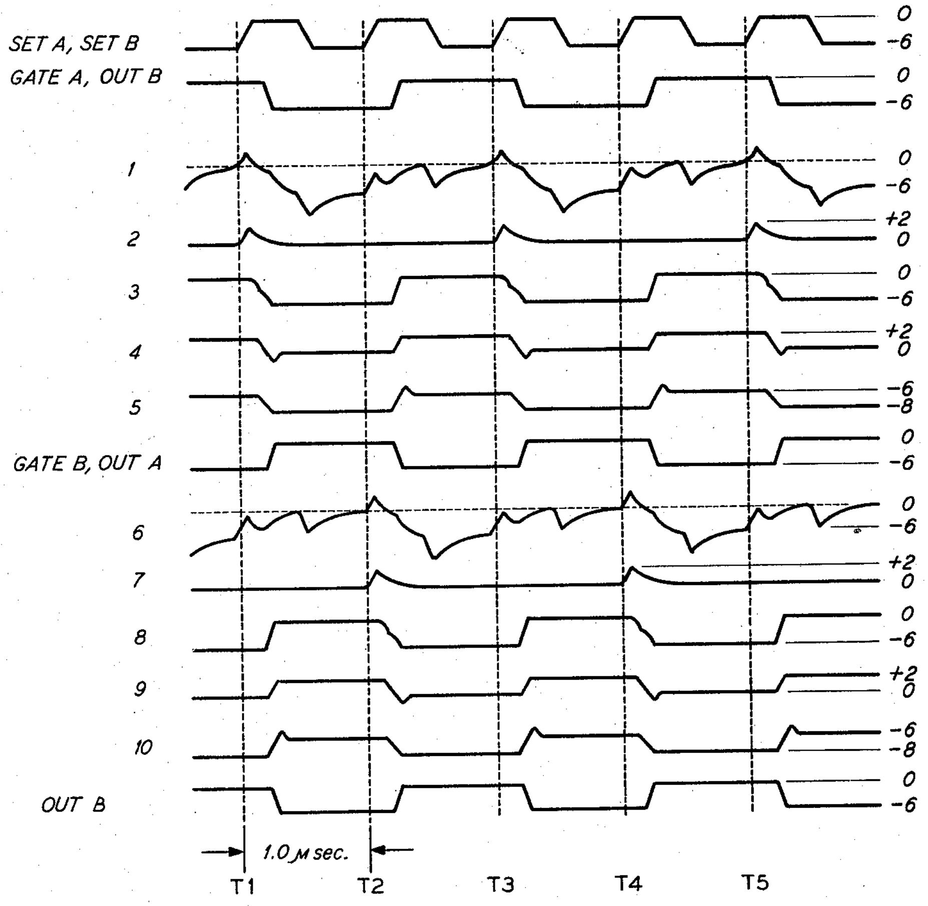
Fig. 2 is a graph illustrating voltage waveforms taken at various points of the circuit of Fig. 1.

Referring to Figs. 1 and 2, at time T1, Gate A is at 0 volts and the potential at point 1 is approaching 0 volts on an exponential charging curve. As the Set A input pulse rises following T1 time, the transient produced is coupled through the capacitor 20 to point 1 and as the potential at point 1 rises above ground, current flows in the diode to point 2 thus raising the potential at point 2 to approximately positive 2 volts which is sufficient to cut off the normally conducting P–N–P input transistor 11. Since the P–N–P input transistor acts as a current switch in the collector circuit of the N–P–N emitter follower 24, the potential at point 3 will drop from 0 to a negative 6 volts as the P–N–P input transistor cuts off and the negative-going transient produced causes the P–N–P output driver 35 to conduct by forcing the potential at point 4 slightly below 0 volts. At the same time, the N–P–N output driver 36 is cut off because the potential at point 5 drops well below the emitter voltage of negative 6 volts. The P–N–P output driver forcibly pulls the N–P–N output driver out of saturation thus assuring good rise time even under load. As shown in Fig. 2, the Out A potential is driven sharply from a negative 6 volts to 0 volts.

At T1 time, the Gate B potential is at a negative 6 volts and the potential at point 6 is approaching negative 6 volts from a more negative potential. Here, the transient rise of the input Set B pulse coupled through the capacitor 52 cannot raise the potential at point 6 to ground and consequently point 7 does not see any change since the diode 53 is back-biased.

The P–N–P input transistor 54 in stage B remains biased in a state of conduction so that when the Out A potential rises, the potential at point 8 is driven up by the action of the N–P–N emitter follower 55 and the resulting positive-going transient is coupled to points 9 and 10 to cut off the P–N–P output driver 56 and cause conduction in the N–P–N output driver 57. Here, the N–P–N driver is effective in bringing the P–N–P out of saturation and thus the complemented inverter output driver prevents delay in switching due to minority carrier storage as well as providing for good output waveforms and load handling capabilities. The total time elapsed from the start of the input pulse until the trigger has completely changed state is 0.3 microsecond.

The condition of the gates is now reversed; consequently, at T2 time, Gate B is conditioned to admit the input pulse and Gate A prevents the input pulse from affecting the potential at point 2.

At T2 time, the potential at point 6 now rises above 0 volts with the input Set B pulse and this in turn raises the potential at point 7 cutting off the P–N–P transistor 54 in stage B of the trigger. The result is a drop in potential at points 8, 9 and 10 and a rise in potential on the Out B line 34. The rise in potential on output line 34 is applied, via the feedback wire 33 and capacitor 32, to the emitter follower 24 in stage A and this causes the potential at point 3 to be driven from negative 6 volts to 0 volts. The resulting positive transient at points 4 and 5 produces a negative-going wave form on the Out A line 39.

The trigger will remain in this condition until the next impulse at T3 time. In this way, the trigger changes state with each input pulse in accordance with binary operation.

As was previously mentioned, a feature of the present invention resides in the provision of means for breaking up the feedback loop without an overriding or bucking action. The low impedance of the feedback loops 33 and 39 necessary for high speed operation would normally necessitate severe input pulse requirements and the application of such input pulses at the Reset A terminal 28, for example, would produce undesirable feedback resulting in voltage spikes at Out B. The necessity for overriding the feedback is eliminated by providing the gate input inverter arranged to control the voltage on the collector of the emitter follower. The inverter controls the current in the emitter follower and therefore controls the output. In addition, it is useful in inverting the Set and Gate pulses which are both positive.

The reset pulse is applied to the base of the input emitter follower through a diode, such as indicated at 29, in such a way that it overrides both the input and the feedback and, in fact, both sides of the trigger may be held in the "off" condition by applying reset signals to both sides of the trigger simultaneously. Further, the trigger will indicate which reset pulse terminated first by turning that output "on." It is significant that if, for example, Reset A should end before Reset B by as little a difference in time as 0.1 microsecond, the trigger would indicate the fact. This characteristic may be put to use to develop a phase detection circuit, as shown in Fig. 5.

Figure 5:
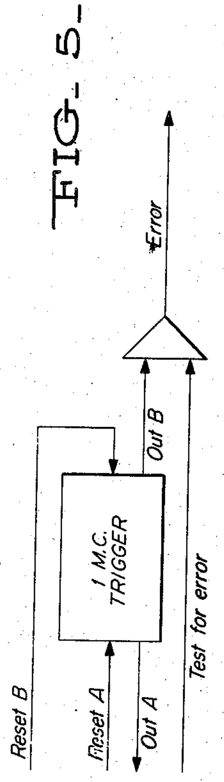
Fig. 5 shows a simplified phase detection device embodying the present invention.
Figure 6:
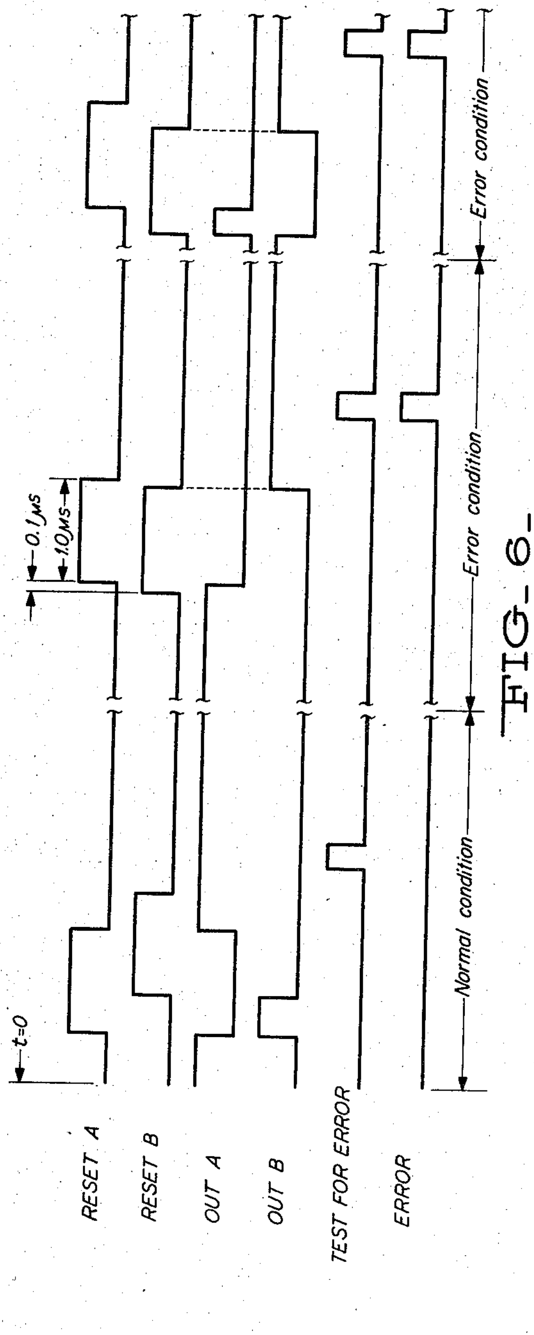
Fig. 6 is a graph illustrating voltage waveforms for the circuit of Fig. 5.

Referring to Figs. 5 and 6, assume that the Reset A pulse normally precedes the Reset B pulse and assume that the Out A side of the trigger is "on" at 0 time. When the Reset A pulse is applied to the trigger, Out A will go "off" and Out B will come "on." Next, Reset B is applied to the trigger and Out B goes "off." As long as Reset A and Reset B are on coincidentally, both Out A and Out B remain "off." As soon as Reset A ends, Out A will come "on." Since the only output taken from the trigger is Out B, no error can be indicated by this sequence of events.

The center section of the waveform shows the error condition. Here, Reset B has moved ahead of Reset A in time. When Reset B comes up, it has no effect because Out B is already "off." Immediately following Reset B, Reset A comes "on" and Out A, which had been "on," goes "off." When Reset B ends, Out B is turned "on." When Reset A ends, Out A cannot turn "on" because Out B is already "on" and holds it "off." Out B will remain "on" until the next set of Reset pulses. The test for error pulse samples Out B, and finding it "on," indicates an error.

If the next set of Reset pulses is such that Reset B precedes Reset A, the error condition will repeat itself. If the next set of Reset pulses are in normal sequence, then Out A will come "on" and Out B will go "off" until the following sequence of Reset pulses.

Figure 3:
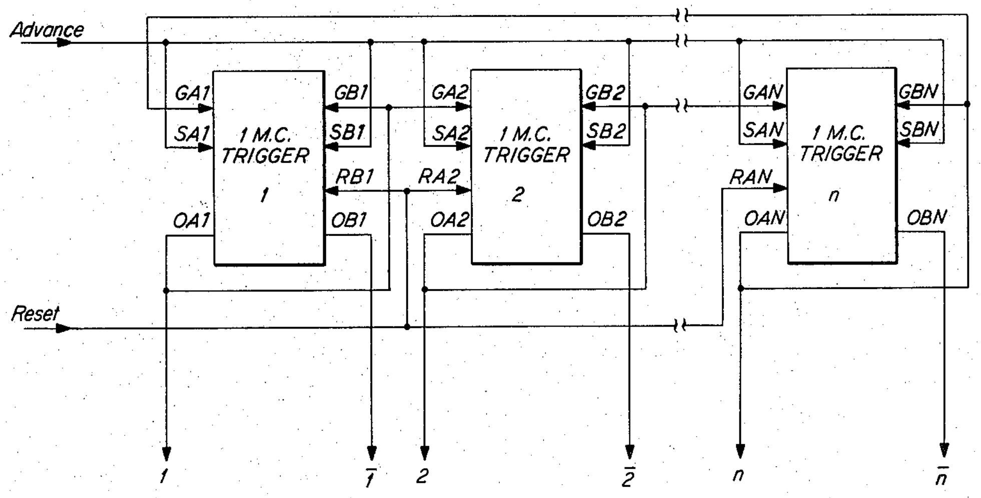
Fig. 3 is a block diagram showing the application of the present invention in a ring circuit.

In the embodiment shown in Fig. 3, the trigger has been applied to make up a ring. For use in a ring, the triggers are connected so that a common input or "advance" line turns off the stage that is on and turns on the next stage. As shown in Fig. 3, the ring is connected with Gate A to Out A of the previous stage, Gate B to Out A of the same stage, and Set A and Set B commoned for all stages. Reset A is used to reset all stages "off" but the first stage and Reset B of the first stage turns the first stage "on."

With the first stage reset "on," Gate B1 and Gate A2 condition the respective Set inputs so that the first advance pulse turns stage 1 "off" and turns stage 2 "on." No other gates in the ring are effective at the time of the first pulse, which reduces the loading on the advance line. After the first advance pulse, Out A2 conditions Gate B2 and Gate A3 so that the next advance pulse turns off stage 2 and turns on stage 3. This continues until the last stage of the ring, which has its output OAN connected to Gate BN and Gate A1. After N advance pulses, then, the ring of N stages recycles and stage 1 turns on again.

Figure 4:
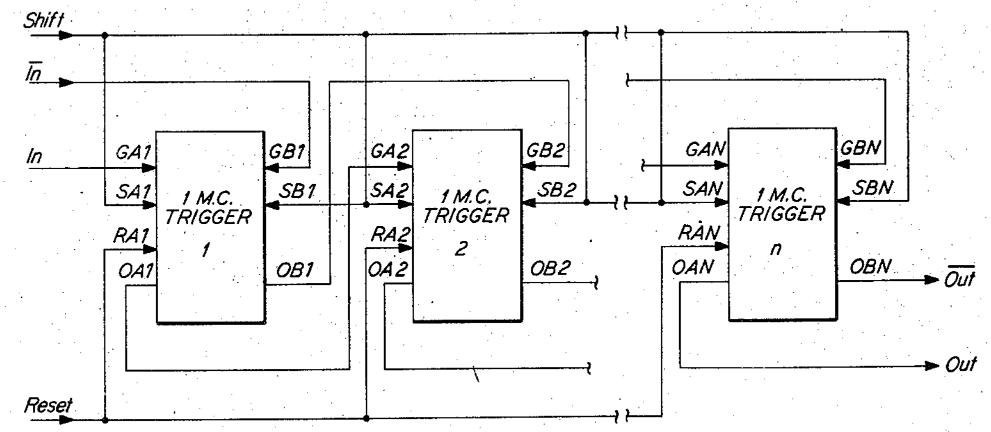
Fig. 4 is a block diagram showing the application of the present invention in a shift register.

In the embodiment shown in Fig. 4, the trigger has been applied to make up a shift register. The triggers are connected so that the common "shift" input sets each stage to the state of the previous stage prior to the shift pulse. The first stage receives the information from a source external to the shift register. As shown in Fig. 4, the shift register is connected with Gate A to Out A of the previous stage, Gate B to Out B of the previous stage, and Set A and Set B commoned for all stages. Reset A is used to reset all stages "off" and Reset B may be used to set stages "on" in a selective manner (parallel or side entry input).

The serial information input may be connected directly to Gate A1 and the inverse or complementary input to Gate B1. In this case, the shift pulse acts as the input "sampling" pulse. Information present at the input prior to the sampling pulse appears in the first stage following the pulse. The next stage sets to this bit of information on the succeeding pulse, etc.

It is evident with this gating system that one set input is active in each register position at all times. If the parallel or side entry system is used, the first stage may be connected to set "off" or set to 0 by connecting Gate A1 to negative 6 volts and Gate B1 to 0 volts. This allows the register to clear as the information is shifted out.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A transistor trigger circuit of the class described wherein each trigger stage comprises an input inverter, an emitter follower, and a complemented inverter output driver, means connecting said emitter follower between the output of said input inverter and the input to said complemented inverter output driver, gated input signal means connected to said input inverter, and reset signal means connected to said emitter follower.

2. A transistor trigger circuit of the class described wherein each trigger stage comprises an input inverter, an emitter follower, and a complemented inverter output driver, means connecting said emitter follower between the output of said input inverter and the input to said complemented inverter output driver, a feedback loop between the emitter follower of a stage and the complemented inverter output driver of the next adjacent stage, and gated input signal means connected to said input inverter for controlling said input inverter and said emitter follower whereby said feedback loop is broken.

3. A transistor trigger circuit of the class described wherein each trigger stage comprises a P–N–P input inverter transistor, an N–P–N emitter follower transistor, and a P–N–P transistor and N–P–N transistor arranged as a complemented inverter output driver, each of said transistors having a base, an emitter and a collector, means connecting the collector of said input inverter to the collector of said emitter follower, means connecting the emitter of said emitter follower to the base of each transistor in said complemented inverter output driver, and gated input signal means connected to the base of said input inverter.

4. A transistor trigger circuit as in claim 3 wherein the complemented inverter output driver of each stage is connected to the base of the emitter follower in the next adjacent stage to form a feedback connection, said gated input signal means being effective to break said feedback connection.

5. A transistor trigger circuit as in claim 3 wherein the complemented inverter output driver of each stage is connected to the base of the emitter follower in the next adjacent stage to form a feedback connection, said gated input signal means being effective to break said feedback connection, and reset signal means connected to the base of the emitter follower and effective to override both said gated input signal means and said feedback connection.

6. A transistor trigger circuit of the class described wherein each trigger stage comprises a normally conducting P–N–P input inverter transistor, an N–P–N emitter follower transistor, and a P–N–P transistor and N–P–N transistor arranged as a complemented inverter output driver, each of said transistors having a base, an emitter and a collector, means connecting the collector of said input inverter to the collector of said emitter follower, means connecting the emitter of said emitter follower to the base of each transistor in said complemented inverter output driver, a feedback loop connected between the base of the emitter follower and the output of the complemented driver of the adjacent stage, and gated set pulse means connected to the base of the input inverter for cutting said input inverter off thereby breaking said feedback loop.

7. A transistor trigger circuit of the class described wherein each trigger stage comprises a P–N–P input inverter transistor, an N–P–N emitter follower transistor, and a P–N–P transistor and N–P–N transistor arranged as a complemented inverter output driver, each of said transistors having a base, an emitter and a collector, means connecting the collector of said input inverter to the collector of said emitter follower, means connecting the emitter of said emitter follower to the base of each transistor in said complemented inverter output driver, and an incandescent lamp in the collector circuit of said N–P–N output driver for protecting the complemented output driver against circuit overloads.

8. A transistor ring circuit of the class described comprising a plurality of trigger stages, each trigger stage having an A side and a B side, each said side including an input inverter, an emitter follower, and a complemented inverter output driver, with means connecting said emitter follower between the output of said input inverter and the input to said complemented inverter output driver, a connection between the input inverter in side A of each trigger stage and the complemented inverter output driver in the A side of the preceding trigger stage for providing Gate pulses for the A sides of said trigger stages, a connection between the input inverter in side B of each trigger stage and the complemented inverter output driver in side A of the same trigger stage for providing Gate pulses for the B sides of said trigger stages, a Set pulse line connected in common with the input inverters in all of the trigger stages for turning off the stage that is "on" and turning "on" the next stage, a Reset pulse line connected to the emitter follower in the A side of all trigger stages except one of said plurality of stages for resetting all stages "off" except said one stage, and a connection between said Reset pulse line and the emitter follower in the B side of said one trigger stage for turning said one stage "on."

9. A transistor shift register circuit of the class described comprising a plurality of trigger stages, each trigger stage having an A side and a B side, each said side including an input inverter, an emitter follower, and a complemented inverter output driver, with means connecting said emitter follower between the output of said input inverter and the input to said complemented inverter output driver, a connection between the input inverter in side A of each trigger stage except one of said plurality of stages and the complemented inverter output driver in the A side of the preceding trigger stage for providing Gate pulses for the A sides of all trigger stages except said one stage, means external to the shift register for gating the input inverter in the A side of said one trigger stage, a connection between the input inverter in side B of each trigger stage except said one stage and the complemented inverter output driver in the B side of the preceding trigger stage for providing Gate pulses for the B sides of all trigger stages except said one stage, means external to the shift register for gating the input inverter in the B side of said one trigger stage, a Shift pulse line connected in common with the input inverters in all of the trigger stages so that each stage is set to the state of the previous stage prior to the shift pulse, and a Reset pulse line connected to the emitter follower in the A side of all trigger stages for resetting all stages "off."

10. A transistor phase detection circuit of the class described comprising a transistor trigger stage having an A side and a B side, each side including an input inverter, an emitter follower, and a complemented inverter output driver, with means connecting said emitter follower between the output of said input inverter and the input to said complemented inverter output driver, a first Reset pulse line connected to the emitter follower in the A side of said trigger for turning the output from the output driver in said A side "off," a second Reset pulse line connected to the emitter follower in the B side of said trigger for turning the output from the output driver in said B side "off," coincidence of said reset pulses maintaining both sides of said trigger in the "off" state, an "and" gate, a connection between the complemented inverter output driver in the B side of said trigger and one input of said "and" gate, and an error test pulse line connected to another input of said "and" gate for sampling the status of the side B output of the trigger, said "and" gate producing an error signal upon coincidence between the side B output of the trigger and said error test pulse.

References Cited in the file of this patent

UNITED STATES PATENTS

| | | |
|---|---|---|
| 2,749,437 | Parr | June 5, 1956 |
| 2,773,983 | Baker | Dec. 11, 1956 |